April 12, 1927.
M. O. REEVES
1,624,895
VARIABLE SPEED REDUCTION GEARING
Filed Nov. 6, 1924
2 Sheets-Sheet 2
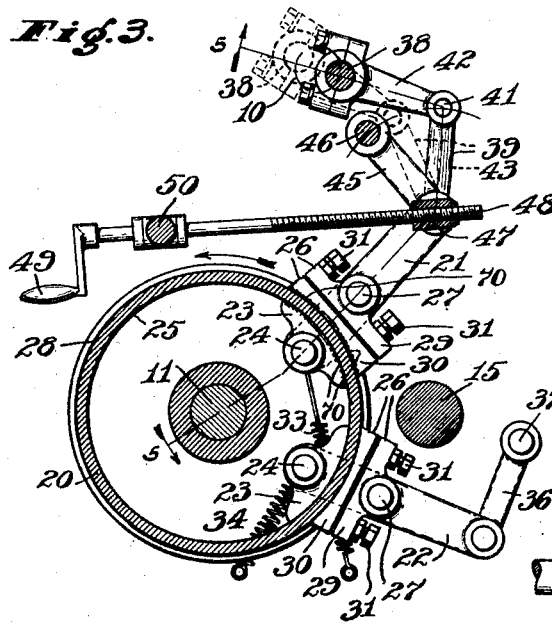
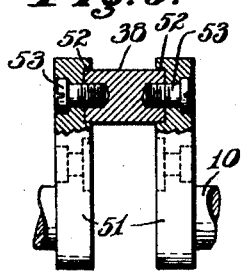
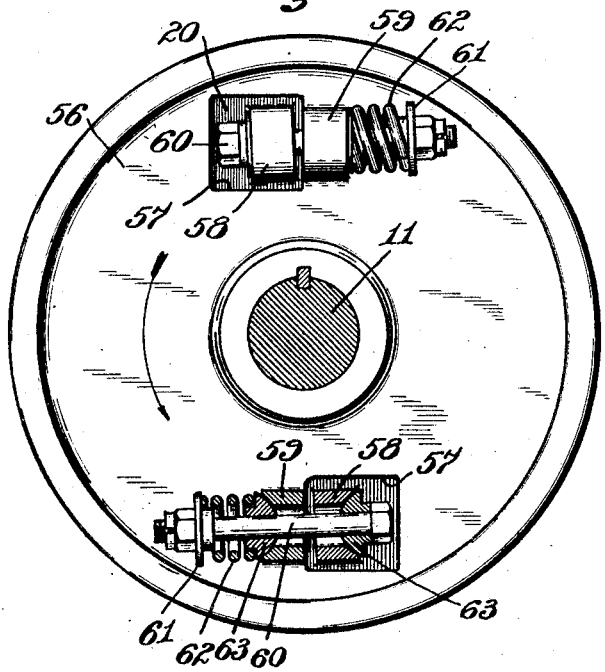
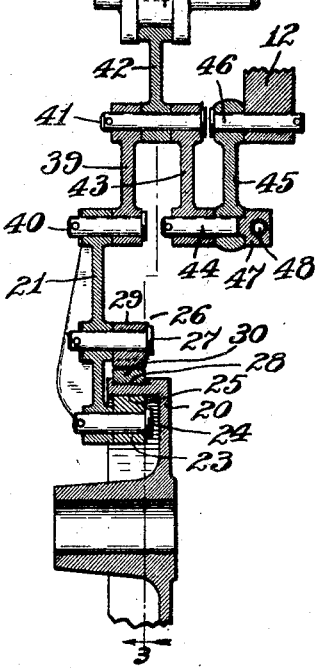
INVENTOR.
MILTON O. REEVES,
BY
Hood & Hahn
ATTORNEYS Patented Apr. 12, 1927.

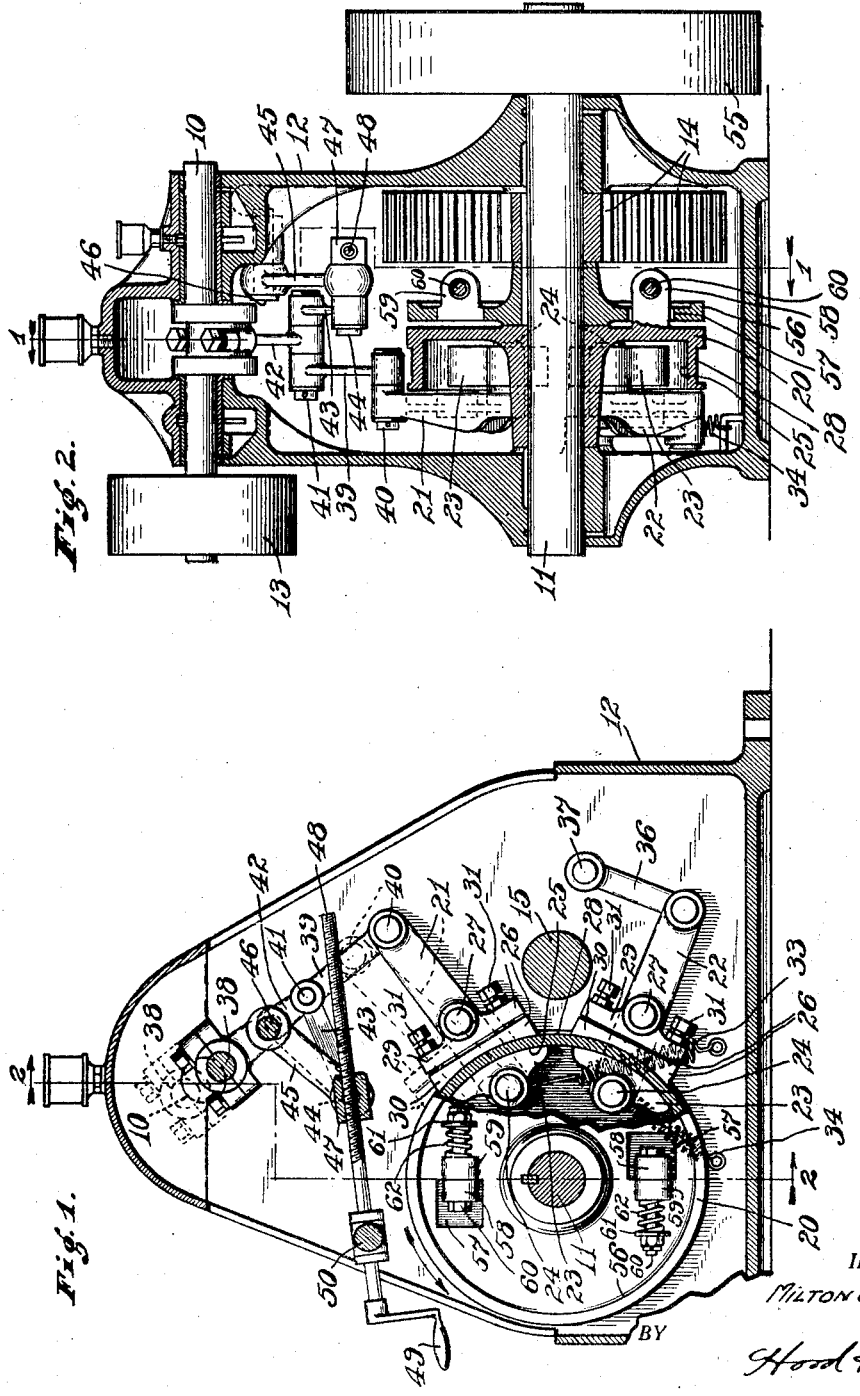

1,624,895

UNITED STATES PATENT OFFICE.

MILTON O. REEVES, OF COLUMBUS, INDIANA, ASSIGNOR TO REEVES-PULLEY COMPANY, OF COLUMBUS, INDIANA, A CORPORATION OF INDIANA.

VARIABLE-SPEED REDUCTION GEARING.

Application filed November 6, 1924. Serial No. 748,117.

It is the object of my invention to provide a simple and effective speed-reducing power-transmission, and desirably one in which the speed-reduction is variable at will.

My invention is especially applicable for use in driving slow-speed mechanism, such as assembling conveyors.

In carrying out my invention, I provide a relatively high-speed driving shaft and a relatively low-speed rotatable driven member; a frictional gripping device which may be oscillated by said driving shaft, and which co-operates with said driven member to move it forward by steps; and desirably another frictional gripping device which also co-operates with said driven member, and which prevents backward movement thereof. This oscillation of the first gripping member from the driving shaft is desirably produced through mechanism by which the length of oscillation may be adjusted from zero to maximum, to vary the angular forward movement of the driven member obtained upon each rotation of the driving shaft. In addition, I find it desirable to mount the driven member loosely on a driven shaft connected with a fly-wheel, and to provide a resilient connection between such driven member and such driven shaft, so that the driven shaft and fly-wheel may have a fairly uniform motion although the driven member on the shaft has a pulsating motion.

The accompanying drawings illustrate my invention: Fig. 1 is a transverse vertical section through a variable speed-reducing mechanism embodying my invention, the section being taken substantially on the line 1—1 of Fig. 2, with the speed-adjusting mechanism set for maximum speed of the driven member; Fig. 2 is a longitudinal vertical section substantially on the line 2—2 of Fig. 1; Fig. 3 is a sectional view generally similar to Fig. 1, without the frame, with the section taken on the line 3—3 of Fig. 5, and with the speed-adjusting mechanism set for zero speed of the driven member; Fig. 4 is an enlarged fragmental view showing the resilient connection between the driven member and the driven shaft, corresponding in general to the lower left-hand corner of Fig. 1; Fig. 5 is a developed sectional view, following the line 5—5 of Fig. 3, to indicate the nature of the connection between the driving shaft and the driven member; and Fig. 6 is a longitudinal section through a driving shaft having an adjustable eccentric.

The driving shaft 10 and the driven shaft 11 are mounted in any suitable supporting frame 12. The driving shaft 10 is the relatively high-speed shaft; and may receive power from any suitable source, as by a belt-and-pulley drive including a pulley 13 carried by such shaft. The driven shaft 11 is the relatively low-speed shaft; and may be connected to drive any suitable mechanism in any desired way, being shown connected through a two-gear speed-reduction gearing 14 to a counter-shaft 15, from which power may be taken in any suitable way.

The driven shaft 11 carries and is driven from a driven ring 20, which is desirably resiliently connected with the driven shaft 11 by mechanism hereinafter described. The driven member or ring 20 cooperates with two pinch-bars 21 and 22, which grip the annular rim of the driven member 20. While the gripping mechanism of the pinch-bars may take different forms, I show such gripping mechanism as comprising an inner gripping member 23 mounted on a transverse trunnion 24 on the inner end of each pinch-bar 21 and 22 and shaped to fit against the inner face 25 of the annular rim of the driven member, and an outer gripping member 26 mounted on a transverse trunnion 27 at an intermediate point on each pinch-bar 21 and 22 and shaped to fit against the outer face 28 of the said annular rim. Each outer gripping member 26 is desirably formed of two parts 29 and 30, which are relatively adjustable by set-screws 31 to vary the effective rim-receiving space between the gripping member 23 and the part 30 of the gripping member 26. The surfaces 25 and 28 are desirably finished surfaces, and cooperate with finished surfaces of the parts 23 and 30. Either or both of the parts 23 and 30 may be of bearing metal, such as brass or bronze, though this is not essential. The inner ends of the two pinch-bars 21 and 22 are drawn downward by springs 33 and 34, which tilt such pinch-bars out of the radius of the driven member 20 so that the faces 25 and 28 are gripped by the parts 23 and 30.

The outer end of the pinch-bar 22 is hung from a link 36, suitably pivoted on a stationary pin 37 projecting from the wall of the frame 12; and has no angular movement about the shaft 11. Thus the pinch-bar 22 prevents clockwise rotation of the driven member 20, by gripping it between the parts 23 and 30; but permits free counter-clockwise movement of the member 20.

The outer end of the pinch-bar 21, however, is arranged to be oscillated angularly about the shaft 11, desirably through an angle of oscillation which is adjustable from zero to maximum. To this end the outer end of this pinch-bar is connected to a crank 38 of the driving shaft 10, by a link-motion which will presently be explained. When the outer end of pinch-bar 21 is moved clockwise around the axis of the shaft 11, the parts 23 and 30 of this pinch-bar merely release the driven member 20 and allow said parts to slide relatively clockwise on the driven member, under the influence of the spring 34 of that pinch-bar. When the outer end is moved counter-clockwise around the shaft axis, however, the parts 23 and 30 grip the driven member 20 and carry it counter-clockwise with the pinch-bar.

Thus in effect, the two pinch-bars 21 and 22 constitute a frictional ratchet device; with the throw of the ratchet adjustable by the link-motion now to be explained.

This link-motion, which connects the outer end of the pinch-bar 21 to the crank 38 of the driving shaft 10, comprises a link 39 connecting a pin 40 and a pin 41 of a link 42 connected to the crank 38; a link 43, desirably of equal length with the link 39, connecting the pin 41 and an adjustable pin 44; and a link 45 connecting the adjustable pin 44 and a fixed pivot-pin 46 suitably mounted on the frame 12. The fixed pivot-pin 46 is desirably approximately in the line from the pin 40 to the driving shaft 10. The adjustable pin 44 is carried by a nut 47, carried by a screw 48 provided with a crank-handle 49 by which it may be turned. The screw 48 is supported near the crank by a transverse supporting pin 50 carried by the frame 12, and can swing on pin 50 to permit the arcuate movement of the nut 47 produced by the turning of the screw 48.

When the driving shaft 10 is rotating, it acts through its crank 38 and the link 42, to rock the link 43 at all times about the adjustable pin 44, and to oscillate the pin 41 in an arc about said adjustable pin. This oscillation of the pin 41 acts through the link 39 to produce oscillation of the pin 40 and the pinch-bar 21 about the shaft 11. The extent of this oscillation of the pin 40 and pinch-bar 21 depends on the relative positions of pin 40 and the adjustable pin 44.

By turning the crank 49 and screw 48, the length of throw of the pinch-bar 21 may be adjusted from zero to a maximum. When the screw 48 is turned to shift the nut 47 and adjustable pin 44 to the position shown in Fig. 3, the pin 44 is in alinement with the pin 40 connecting the link 39 to the pinch-bar 21, and with such adjustment, the rotation of the driving shaft 10 acts through the crank 38 and link 42 merely to rock both links 39 and 43 about the pin 44 as a center; and, as the pin 44 is stationary, and the pin 40 is in alinement with pin 44, there is no movement of the pinch-bar 21. When the screw 48 is turned to shift the nut 47 and adjustable pin 44 to produce disalinement, the rotation of the shaft 10 still acts through the crank 38 and link 42 to rock the link 43 on the adjustable pin 44, but because of the disalinement between the pin 44 and the pin 40, the oscillation of the link 43 is accompanied by an oscillation of the outer end of the pinch-bar 21, through an angle dependent upon the extent of disalinement. The pins 40 and 44 are shown in Fig. 1, in the disalinement which produces substantially the maximum throw of the pinch-bar 21, the link 43 in this position being substantially perpendicular to the link 39 at the time link 43 is midway between the limits of its oscillation, or midway between the full-line and dotted-line positions of link 43 in Fig. 1. The adjustment of the screw may be made freely with the mechanism in operation. The crank 38 of the driving shaft may itself have a variable eccentricity if desired. A simple way of obtaining this is shown in Fig. 6. Here the driving shaft 10 is provided with two disks 51 provided with holes 52 at different distances from the center to receive the ends of the crank pin 38; which may be fastened in place in any set of such holes in any suitable way, as by screws 53.

In order to get a more uniform motion of the driven shaft 11 and the mechanism receiving power therefrom, it is desirable to provide a resilient mounting between such shaft 11 and the driven member which is carried by and drives such shaft, and to provide a fly-wheel 55 on shaft 11. The driven member 20 is journalled on the driven shaft 11, alongside a disk 56 fixed on the shaft 11, and provided with openings 57 through which project fingers 58 from the adjacent face of the driven member 20. Fingers 59 project from the face of the disk 56, and lie beside the fingers 58. There may be any number of pairs of fingers 58—59, but only two pairs are shown. A tension bolt 60 extends through holes in each pair of fingers 58—59, and carries a washer 61 between which and one of said fingers (here the finger 59) a compression spring 62 encircles the bolt 60. If desired, ball members 63 may be interposed between the head of the bolt 60 and the spring 62 and the respective fingers 58 and 59. By this arrangement, the counter-clockwise intermittent movements of the driven member 20 are transmitted through the springs 62 to the disk 56 and the driven shaft 11; and the latter shaft tends to move at uniform speed by reason of the effect of the fly-wheel 55, the relative movements between the driven members 20 and the driven shaft 11 being accommodated by the springs 62.

In many instances it is quite desirable to keep the parts within casing 12 flooded with oil and in order to prevent slippage of shoes 23 and 30 it is necessary to so form them that an objectionable film of oil may not accumulate between the shoe and rim. Transverse grooves or serrations 70 in the faces of the shoes will provide proper oil drainage. The crests of these serrations should have sufficient area to avoid indentation of the rim surfaces 25 and 28.

I claim as my invention:—

1. A speed-producing power transmission comprising a driving shaft having an eccentric, a driven member, a gripping device cooperating with said driven member and angularly movable thereon, two links pivoted together and respectively pivotally connected to said gripping device and to said eccentric, an adjustable pivot pin, a link connecting said adjustable pivot pin to the point of pivotal connection between the first two links.

2. A speed-producing power transmission, comprising a driving shaft having an eccentric, a driven member, a gripping device cooperating with said driven member and angularly movable thereon, two links pivoted together and respectively pivotally connected to said gripping device and to said eccentric, an adjustable pivot pin, a link connecting said adjustable pivot pin to a point on one of said first two links.

3. A speed-producing power transmission, comprising a driving shaft having an eccentric, a driven member, a gripping device cooperating with said driven member and angularly movable thereon, two links pivoted together and respectively pivotally connected to said gripping device and to said eccentric, an adjustable pivot pin, a link connecting said adjustable pivot pin to a point on that one of the first two links which is pivotally connected to said gripping device.

4. A speed-producing power transmission, comprising a driving shaft having an eccentric, a driven member, a gripping device cooperating with said driven member and angularly movable thereon, two links pivoted together and respectively pivotally connected to said gripping device and to said eccentric, an adjustable pivot pin, a link connecting said adjustable pivot pin to a point on that one of the first two links which is pivotally connected to said gripping device, said adjustable pivot pin being adjustable into and out of alinement with the point of pivotal connection between said gripping device and the link directly pivotally connected to said gripping device.

5. A speed-producing power transmission, comprising a driving shaft having an eccentric, a driven member, a gripping device cooperating with said driven member and angularly movable thereon, two links pivoted together and respectively pivotally connected to said gripping device and to said eccentric, an adjustable pivot pin, a link connecting said adjustable pivot pin to a point on that one of the first two links which is pivotally connected to said gripping device, a fourth link interconnecting said adjustable pivot pin to a supporting point, and means for adjusting said fourth link about its pivot to produce alinement and different degrees of disalinement between said adjustable pivot pin and the pivotal connection point between said gripping device and the link directly pivoted to said gripping device.

In witness whereof, I have hereunto set my hand at Indianapolis, Indiana, this 1st day of November, A. D. one thousand nine hundred and twenty-four.

MILTON O. REEVES.